Figures 1, 2:
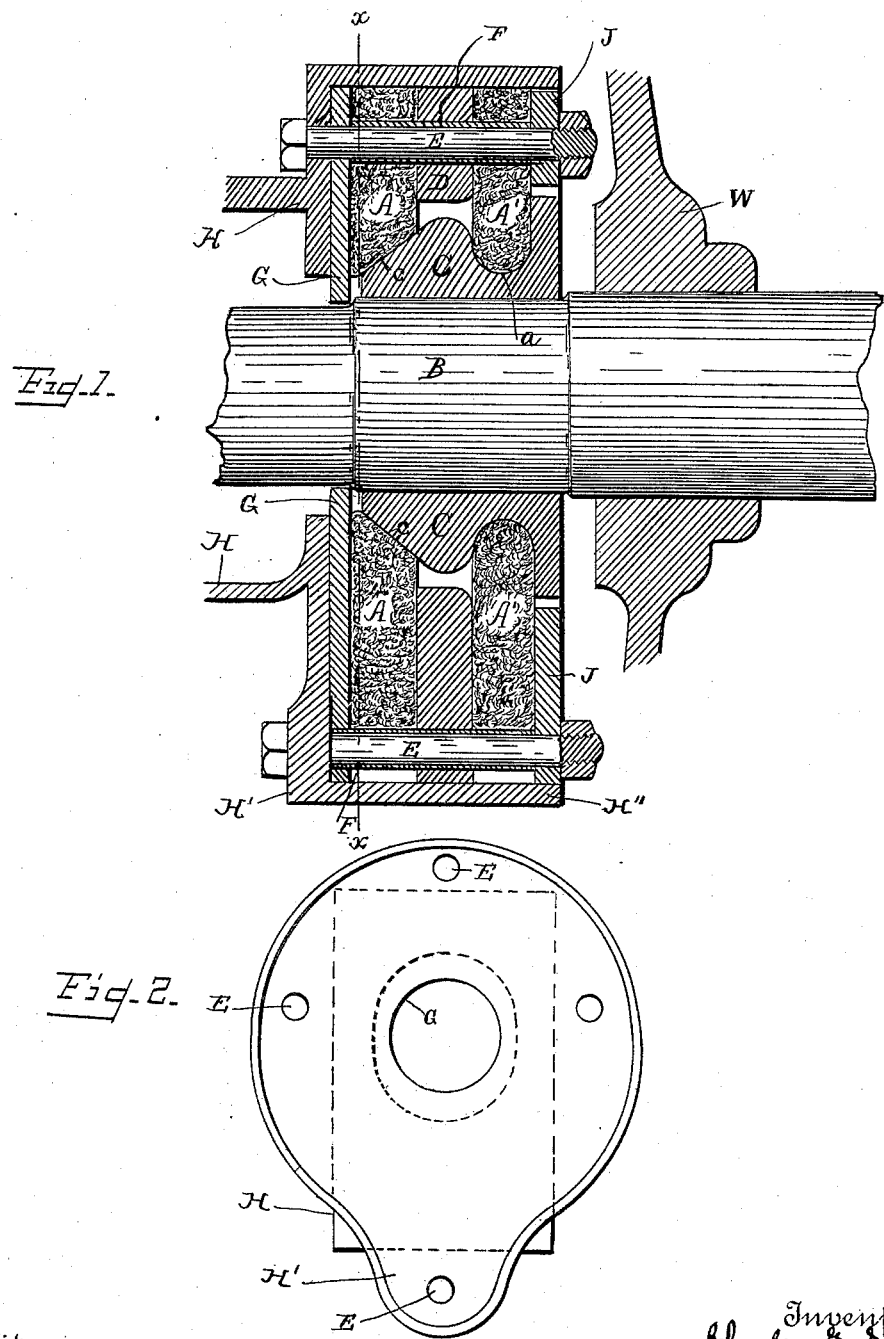

(No Model.)

C. G. STEARNS.
DUST GUARD FOR JOURNAL BOXES.

No. 395,087. Patented Dec. 25, 1888.

Witnesses.
Ira R. Steward
Louis W. Flint

Inventor.
Charles G. Stearns
By Hoyt & Coe
Attorneys

UNITED STATES PATENT OFFICE.

CHARLES G. STEARNS, OF NEW YORK, N. Y.

DUST-GUARD FOR JOURNAL-BOXES.

SPECIFICATION forming part of Letters Patent No. 395,087, dated December 25, 1888.

Application filed April 4, 1888. Serial No. 269,546. (No model.)

*To all whom it may concern:*

Be it known that I, CHARLES G. STEARNS, a citizen of the United States, residing in the city, county, and State of New York, have invented a new and useful Improvement in Dust-Guards for Cars, &c., of which the following, taken in connection with the accompanying drawings, is a full, clear, and accurate description.

The object of my invention is to construct dust-guards for cars, &c., so as to exclude grit and dust from entering the journal-boxes, and to retain the oil and preserve it in a pure and limpid condition.

In the drawings, Figure 1 represents a plan view of my improved dust-guard; Fig. 2, a section view of part of the same through the line $x\ x$.

Similar letters of reference refer to similar parts.

My invention consists, primarily, in attaching to the axle B the peculiar-shaped ring or hub C, and also the felted rings or washers A A', closely fitting the surfaces of the ring or hub C. The other parts of my invention relate to a peculiar method of holding these parts.

In the drawings, B represents the axle, playing in the journal-box H.

W represents the wheel attached to the axle B. The journal-box H is cast with the elliptical-shaped plate H', provided with a rim, H'', and within this rim H', between the journal-box H and the wheel W, is placed my improvement.

C is a hub or ring placed on the axle B, and having the groove $a$ in the portion nearest the wheel W, and having its surface nearest the journal-box beveled or slanting, as shown at $c$. Fitting closely into the groove $a$, and to the rim H'', is placed a washer, of felt or other flexible porous material A', and fitting closely to the bevel $c$ is placed a similar washer, A. Between the washer A and the casting H' is placed the ring or washer G, made of flexible material or vulcanized rubber. Between the washers A A' is placed the ring D, of such width that it does not touch the hub C, but leaves considerable space between said hub and the inner circumference of said ring.

J is a retaining-ring, by means of which the parts G, A, D, and A' are secured to the casing H' by bolts E passing through them, said bolts E being provided with nuts to secure them, and having around them the washers or collars F.

The operation of my invention is as follows: The oil being supplied to my device is held by the washers A A' and in the passage or space between the ring D and hub C. All grit or dirt is prevented from getting into or mixing with the oil by the close contact which the washers A A' have with said hub C, while the yielding and flexible character of said washers allows the axle B and its hub C to revolve freely and with less friction than in ordinary guards, while the flexible ring G and the retaining-ring J allow sufficiently to the parts without causing any unnecessary friction or leakage.

By my improved invention a dust-guard is produced which is more perfect in the two essential operations of excluding dirt or grit from the working parts of the axle and of the retaining and receiving the full benefit of the oil placed therein than any guard heretofore known.

It will be seen that the construction of the parts of my improved guard is such that they can be readily placed in position from the outside or side nearest the wheel, and any part becoming worn by using can be readily removed and replaced by removing the retaining-ring J, which will give free access to the parts.

Having thus described my invention, what I claim, and desire to secure by Letters Patent, is—

1. A dust-guard for cars and like vehicles, consisting of beveled and molded flexible porous washers held apart by a ring and secured in said guard between a flexible and a non-yielding ring, said flexible and porous washers fitting closely against the molded and grooved surfaces of an auxiliary hub fastened upon the axle.

2. A dust-guard for cars and like vehicles, consisting of beveled and molded flexible porous washers held apart by a ring and secured in said guard between a flexible and a non-yielding ring, said flexible and porous washers fitting closely against the molded and grooved surfaces of an auxiliary hub fastened upon the axle, the whole of said parts being secured to a rimmed plate.

3. A hub having a slanting or beveled surface contiguous to and inclining toward the journal-box, and a groove or depression therein, and fastened on a car or other axle, in combination with flexible porous washers fitting closely against said slanting and grooved surfaces of the hub, said washers being secured in a dust-guard.

4. A dust-guard consisting of a rimmed plate, flexible porous washers held apart by a ring, and a retaining-ring, said washers, ring, and retaining-ring secured in said rimmed plate by bolts and nuts.

5. A dust-guard consisting of a rimmed plate, flexible porous washers held apart by a ring, so arranged as to leave a space between the inner surface of said ring and the axle, and a retaining ring, said washers, ring, and retaining-ring secured in said rimmed plate by bolts and nuts.

6. A hub having a slanting or beveled surface and a groove or depression therein fastened on a car or other axle, in combination with flexible porous washers fitting closely against said slanting and grooved surfaces of the hub, said washers being secured in a dust-guard, in combination with a molded and beveled hub-fastened axle.

7. A dust-guard consisting of a rimmed plate, flexible porous washers held apart by a ring, and a retaining-ring, said washers, ring, and retaining-ring secured in said rimmed plate by bolts and nuts, said bolts being surrounded by additional washers or collars which extend from rim to rim, as shown.

In testimony whereof I have hereunto set my hand this 3d day of April, 1888.

CHARLES G. STEARNS.

In presence of—
LOUIS W. FROST,
R. T. VAN BOSKERCK.